United States Patent
Dougherty, Sr. et al.

(10) Patent No.: US 7,160,024 B2
(45) Date of Patent: Jan. 9, 2007

(54) APPARATUS AND METHOD FOR CREATING A VORTEX FLOW

(75) Inventors: Gregory A. Dougherty, Sr., Gillette, WY (US); Bradley J. Fehn, Highlands Ranch, CO (US); Thomas B. Smith, Centennial, CO (US)

(73) Assignee: Ecotechnology, Ltd., Englewood, CO (US)

( * ) Notice: Subject to any disclaimer, the term of this patent is extended or adjusted under 35 U.S.C. 154(b) by 100 days.

(21) Appl. No.: 10/727,490

(22) Filed: Dec. 5, 2003

(65) Prior Publication Data

US 2005/0039813 A1   Feb. 24, 2005

Related U.S. Application Data

(60) Provisional application No. 60/492,619, filed on Aug. 5, 2003.

(51) Int. Cl.
    *B01F 5/06* (2006.01)
(52) U.S. Cl. .................. 366/336; 366/338; 366/339
(58) Field of Classification Search ............... 366/338, 366/336, 339
    See application file for complete search history.

(56) References Cited

U.S. PATENT DOCUMENTS

| | | | |
|---|---|---|---|
| 835,619 A * | 11/1906 | Isaacs et al. ................. | 366/338 |
| 1,496,345 A * | 6/1924 | Lichtenthaeler ............. | 366/339 |
| 1,626,487 A * | 4/1927 | Warren ..................... | 366/163.2 |
| 1,893,484 A * | 1/1933 | Belt ........................... | 165/160 |
| 2,000,953 A * | 5/1935 | Hooker et al. .............. | 366/339 |
| 2,784,948 A * | 3/1957 | Pahl et al. ................... | 366/339 |
| 2,831,754 A * | 4/1958 | Manka ....................... | 366/338 |
| 3,223,388 A * | 12/1965 | Knox ......................... | 366/339 |
| 3,506,024 A | 4/1970 | Erwin et al. | |
| 3,507,116 A | 4/1970 | Berry | |
| 3,618,398 A | 11/1971 | Posingies et al. | |
| 4,034,964 A * | 7/1977 | Larson ...................... | 366/338 |
| 4,053,141 A * | 10/1977 | Gussefeld .................. | 366/339 |
| 4,088,449 A * | 5/1978 | Smith ........................ | 366/339 |
| 4,111,402 A * | 9/1978 | Barbini ...................... | 366/338 |
| 4,197,092 A * | 4/1980 | Bretz ....................... | 366/169.1 |
| 4,321,963 A * | 3/1982 | Bowden .................... | 165/70 |
| 4,371,036 A * | 2/1983 | Fordsmand ................ | 165/163 |
| 4,884,894 A * | 12/1989 | Hashimoto et al. ........ | 366/338 |
| 4,893,672 A * | 1/1990 | Bader ........................ | 165/163 |
| 5,399,015 A * | 3/1995 | Zhi-qiang et al. .......... | 366/339 |
| 6,027,241 A * | 2/2000 | King ....................... | 366/181.5 |
| 6,102,561 A * | 8/2000 | King ....................... | 366/181.5 |
| 6,155,751 A | 12/2000 | Lane et al. | |
| 6,419,843 B1 | 7/2002 | Natarius | |
| 6,632,370 B1 | 10/2003 | Natarius | |
| 6,659,118 B1 | 12/2003 | Lane et al. | |
| 6,749,374 B1 | 6/2004 | Lane et al. | |
| 2003/0102038 A1 | 6/2003 | Lane et al. | |

* cited by examiner

*Primary Examiner*—Tony G. Soohoo
(74) *Attorney, Agent, or Firm*—Christie, Parker & Hale, LLP.

(57) ABSTRACT

In embodiments of the invention, a vortex chamber tool in a conduit includes: an outer barrel; an inner barrel that is concentric with the outer barrel; and a corkscrew deflector coupled to an inside wall of the outer barrel and an outside wall of the inner barrel to organize the flow of a fluid in the vortex chamber tool. The vortex chamber tool operates to convert a turbulent flow from an input portion of the conduit into a non-turbulent laminar flow at a downstream portion of the conduit.

16 Claims, 10 Drawing Sheets

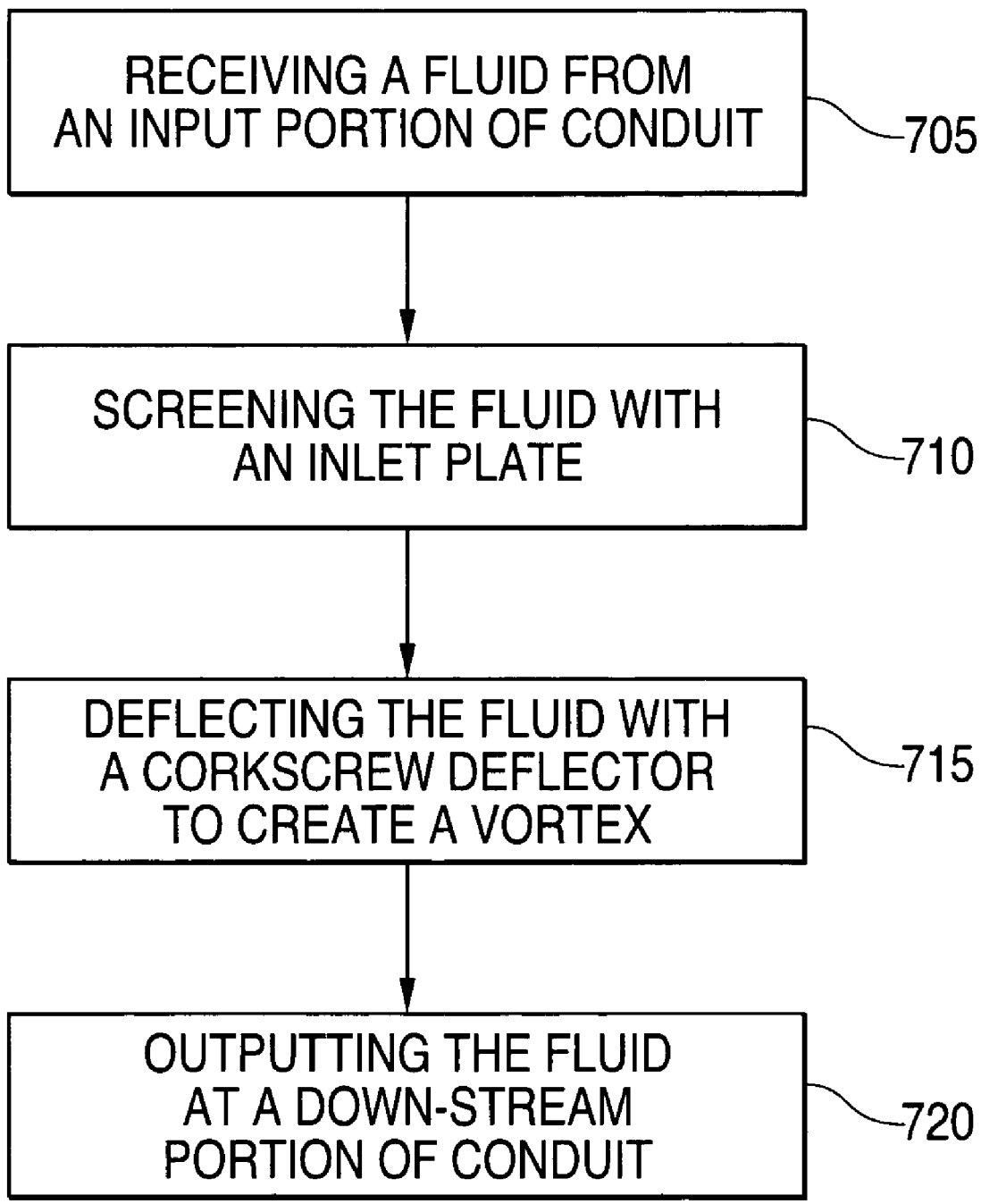

U.S. 7,160,024 B2

APPARATUS AND METHOD FOR CREATING A VORTEX FLOW

CROSS REFERENCE TO RELATED APPLICATIONS

This application claims the benefit of and priority to commonly owned and assigned U.S. provisional application No. 60/492,619, filed Aug. 5, 2003, the disclosure of which is incorporated herein by reference in its entirety.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The invention relates to fluid dynamics. In particular, but not by way of limitation, the invention relates to systems and methods for improving fluid flow in a conduit by creating a vortex. As used herein, fluids include liquids (e.g., oil and/or water), gases, flowable solids, or any combination thereof.

BACKGROUND OF THE INVENTION

In the oil and gas industry, liquids frequently load up (i.e., collect) in a vertical wellbore or inclined or other horizontal conduits. Liquids that cause load up may be water, oil or other hydrocarbons, or a combination thereof. Liquid loading adds backpressure to an oil and gas reservoir. This additional back pressure restricts gas and/or oil production and often reduces the production efficiency to the point where the wells are no longer economically viable. and/or oil production and often reduces the production efficiency to the point where the wells are no longer economically viable.

Additionally, multi-phase (e.g., gas and liquid) pipe flow requires additional gas velocity or pressure to continuously transport the heavier liquid phase. This often results in liquids falling back downhole, or simply not moving at all, resulting in loading up in a vertical wellbore. In horizontal pipe applications, liquids become stagnant and reduce the effective inner diameter of pipe. These stagnant liquids may then also become a source for severe pipe corrosion or pipe freezing.

Many types of 'artificial lift' technology have been developed to combat this fundamental oil and gas production problem. Rod pumps, plunger lift systems, electronic submersible sumps, progressive cavity pumps, pigging, and soap strings are just a few of the methods currently utilized to remove liquids from the wellbore.

Known systems and methods for improving gas or oil production have many disadvantages, however. In particular, many techniques for achieving even a marginal increase in production require additional production and operation costs. In many cases, the increase in production would be outweighed by the added production costs. Thus, many known methods for increasing production do not increase production efficiency, and thus, are not economically viable.

Better techniques are needed for increasing the production efficiency of the transport of fluids, such as oil and/or gas, through a conduit.

SUMMARY OF THE INVENTION

In embodiments of the invention, a tool that creates a vortex chamber within a conduit includes: an outer barrel, an inner barrel that is concentric with the outer barrel, and a deflector coupled to an inside wall of the outer barrel and an outside wall of the inner barrel to redirect a fluid through the vortex chamber. The vortex chamber operates to convert a turbulent flow from an input portion of a conduit (e.g., a oil and gas well flowline) into a more organized flow at a downstream portion of the conduit.

Another embodiment of the vortex chamber tool includes a single barrel with a corkscrew deflector attached to the outside wall of the barrel. This tool could then be inserted directly into an existing conduit and utilize the existing conduit as the outer barrel in other embodiments. This improvement enables the vortex chamber tools to be deployed without having external access to the conduit. The vortex chamber tool can be deployed simply by inserting the tool into the conduit and held in place by conventional fittings (i.e., bumper assemblies, collar stops, etc.). This enables the tools to be installed and retrieved with reduced costs, making many applications economically viable that would not be otherwise.

Another embodiment of the vortex chamber tool includes adjustable inner barrel, an adjustable flow deflector, or both. An adjustable tool would allow the vortex chamber to be optimized for specific applications. In addition, in applications where the flow rates through the conduit may change, or are variable, an automatically adjustable vortex chamber tool is advantageous.

Exemplary embodiments of the invention shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

BRIEF DESCRIPTION OF THE DRAWINGS

Various objects, advantages, and a more complete understanding of the invention are apparent and more readily appreciated by reference to the following Detailed Description and to the appended claims when taken in conjunction with the accompanying Drawings wherein:

FIG. 7 is a process flow diagram of a method for transporting fluid, according to an embodiment of the invention.

DETAILED DESCRIPTION

Figure 1A:
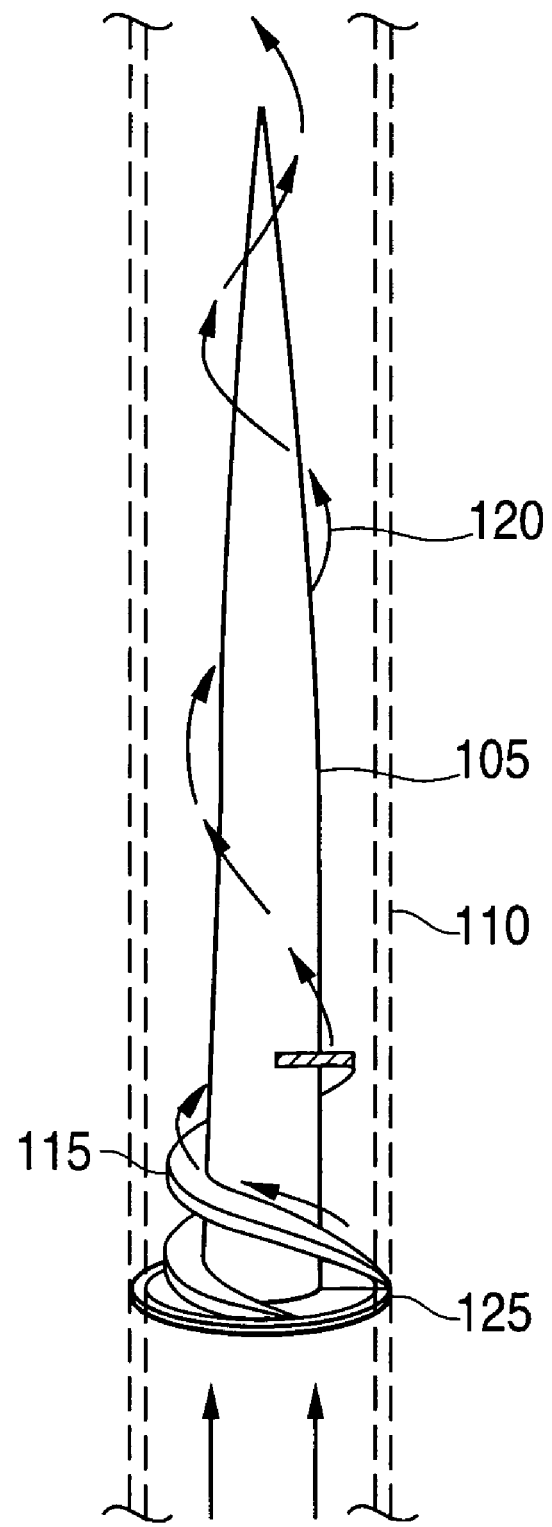
FIG. 1A is a schematic view of a vortex chamber tool, according to an embodiment of the invention.

Whenever a fluid is transported through a pipe or conduit, there is a pressure differential ΔP between the pressure at the inlet of the pipe and the pressure at the outlet. This pressure differential, along with the mass of the volume and any changes in height between the inlet and outlet, determines the amount of energy required to move a volume of fluid through the pipe. This calculation is usually indicated as "head loss," defining how much extra energy is needed as a distance amount of energy if there was no loss due to friction. For example, a 10 ft. pipe may have a head loss of 2 ft.; calculations to determine how much energy would be required to move the fluid 12 ft. will provide the amount of energy used in the actual 10 ft. pipe. Consequently, decreasing the amount of head loss lessens the amount of energy required to transport a fluid in a conduit or pipe.

Flow in a pipe conducting oil and natural gas is usually turbulent. Turbulent flow has a higher head loss than laminar flow in a conduit. Thus, turbulent or other non-laminar flow decreases the rate at which a fluid can progress through a conduit. By creating a vortex flow, the head loss may be lessened by allowing the fluid to be more organized for a section of the conduit, thus decreasing liquid load up, and allowing and increase in gas and liquid production from the well.

In addition to more efficient flow characteristics, in wells with water, oil and gas mixture, the vortex flow regime creates a water boundary layer around the pipe wall. This water boundary layer may also prevent the accumulation of certain solid materials, such as paraffin, scale or other hydrocarbons.

For gas and oil production, organized flow from the vortex chamber creates a helical pattern of oil flow along the wall of the conduit, allowing the gas to flow more freely through the center of the liquid flow. By organizing the gas and liquid components of the flow into two unique sections of the flow regime, the gas portion of the flow can travel to the wellhead without being impeded by the liquid portion of the flow.

Additionally, this organized flow has a direct application benefit as a 'slug stabilizer'. Often when a multi-phase flow well experiences liquid load up, the effective inner diameter of the pipe is restricted so severely that backpressure builds upstream of the pipe restriction until a large volume of liquid is pushed at a high rate of speed downstream. This is called a 'slug'. The organized flow regime created by the vortex chamber greatly increases the number and thus reduces the size of individual slugs in multi-phase pipe flow.

Thus, the vortex chamber tool may increase flow efficiency in a conduit used in oil/gas well operations. Because embodiments of the tools described herein do not require energy from an external source to operate, such tools can provide a cost-effective means for improving the production efficiency of oil and gas operations. Similar benefits exist for other applications of the vortex chamber tools, systems, and/or methods described herein.

Additionally, introducing the flow into the tool from the bottom, linear with the flow exiting the tool, provides a number of practical advantages, including being able to place the tools within smaller conduits. This may be an advantage in oil and gas wells with a casing smaller than 5.5", for example.

Finally, introducing the flow into the tool from the bottom allows the tool to be placed within a linear section of conduit, as opposed to requiring a corner for side entry into the tool. By deploying the tools linearly in the conduit, an oil and gas operator does not need to extract the existing conduit string. Extracting a conduit string is very expensive and lessens the economic advantage of tools requiring removal.

The following detailed description describes exemplary embodiments of a vortex chamber tool for use with a conduit. Embodiments of a vortex chamber tool are described with reference to FIGS. 1–5. Embodiments of the vortex chamber tools are further described in the context of fluid transport systems in FIGS. 6A–6C. Finally, a method for performing an embodiment of the invention is presented with reference to FIG. 7.

While sub-headings are used in this section for organizational convenience, the disclosure of any particular feature(s) is/are not necessarily limited to any particular section or sub-section of this specification.

Exemplary Apparatuses

FIG. 1A is a schematic view of a vortex chamber tool, according to an embodiment of the invention. As shown therein, the tool includes an inner barrel 105, an outer barrel 110, a corkscrew deflector 115, and an inlet plate 125. The inner barrel 105 is substantially concentric with the outer barrel 110. In addition, the inner barrel 105 has a substantially cylindrical end and a substantially conical end. The corkscrew deflector 115 is affixed between the inner diameter of the outer barrel 110 and the outer diameter of the inner barrel 105 at the cylindrical end of the inner barrel 105. The inlet plate 125 is coupled to the cylindrical end of the inner barrel 105.

The outer barrel 110 may be a component of the vortex chamber tool. In the alternative, the outer barrel 110 may be a conduit that the vortex chamber tool is inserted into. The latter case may simplify installation of the vortex chamber tool into existing conduit, as described above.

In operation, a fluid is received at the inlet plate 125 and is deflected by the corkscrew deflector 115 to cause the fluid flow 120 to circulate around the inner barrel 105 in a direction tangential to a longitudinal axis of the inner barrel 105, thus creating a vortex in the flow 120.

Figure 1B:
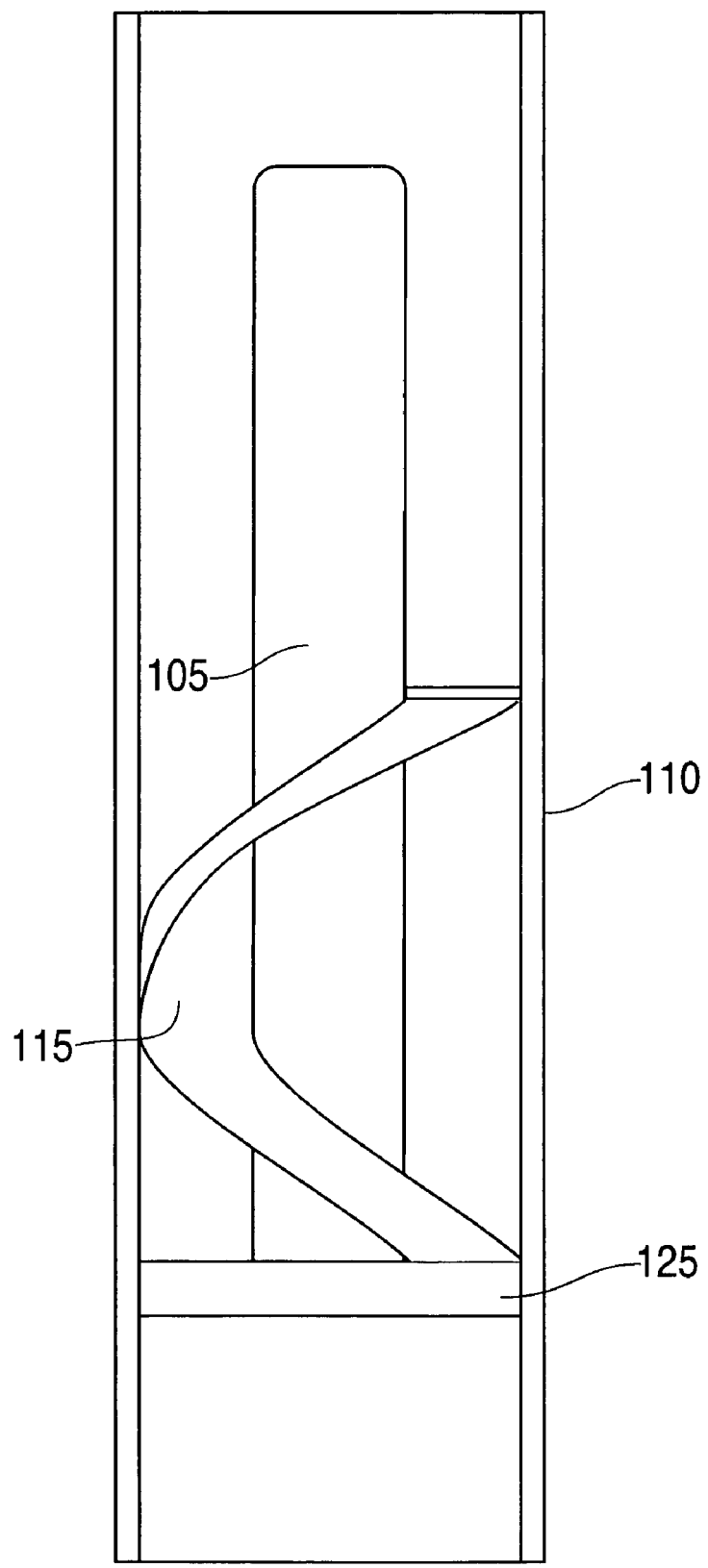
FIG. 1B is a schematic view of a vortex chamber tool, according to an embodiment of the invention.

FIG. 1B is a schematic view of an alternative embodiment, showing a non-tapered, fully concentric inner barrel 105.

Figure 2A:
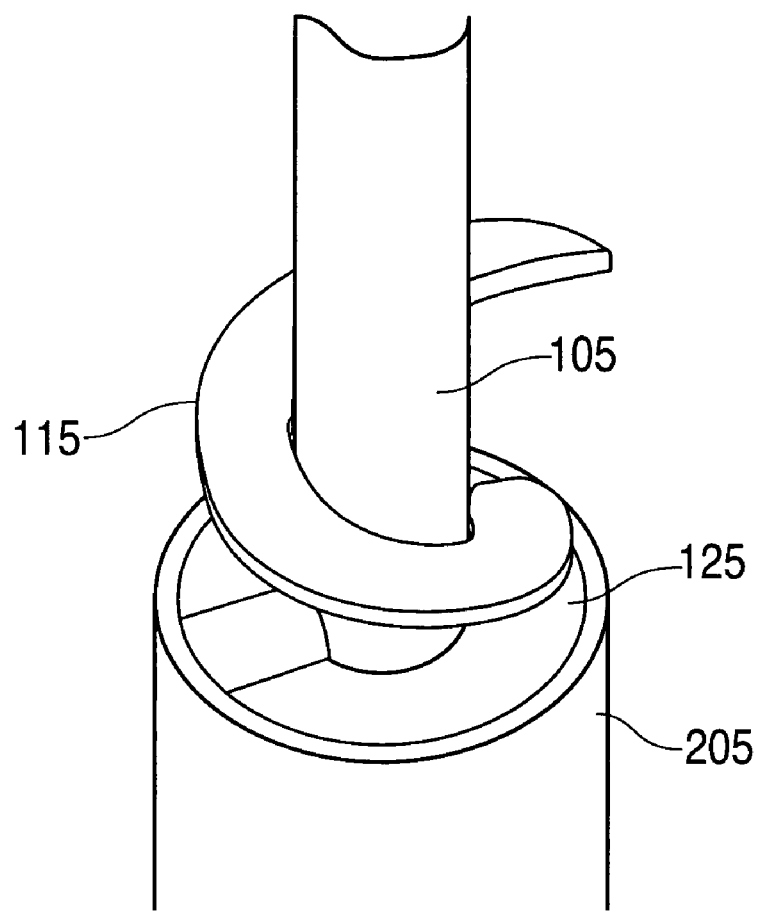
FIG. 2A is a perspective view of a portion of a vortex chamber tool, according to an embodiment of the invention.

FIG. 2A is a perspective view of a portion of a vortex chamber tool according to an embodiment of the invention. As shown therein, an inner barrel 105 is attached at a cylindrical end to an inlet plate 125. In the illustrated embodiment, the inlet plate 125 is further affixed to an input sleeve 205. The input sleeve 205 has substantially the same outer diameter as the outer barrel (not shown) of the vortex chamber tool. FIG. 2A additionally depicts a corkscrew deflector 115 coupled to the inner barrel 105. In the illustrated embodiment, the corkscrew deflector 115 has a 360° turn.

Figure 2B:
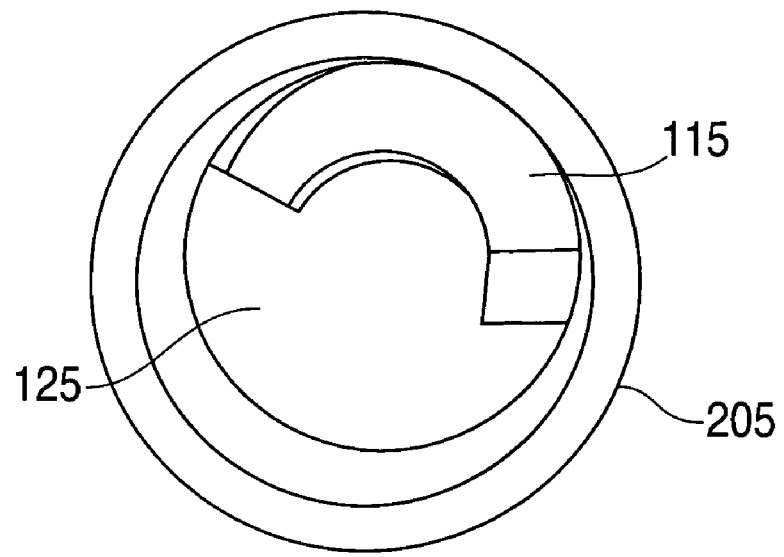
FIG. 2B is a bottom perspective view of a portion of a vortex chamber tool, according to an embodiment of the invention.

FIG. 2B is a bottom perspective view of a portion of a vortex chamber tool, according to an embodiment of the invention. As shown therein, the input sleeve 205 is coupled to the inlet plate 125. A portion of the corkscrew deflector 115 is visible through an opening in the inlet plate 125. Accordingly, the position of the opening in the inlet plate 125 affects the interference between incoming fluids and the corkscrew deflector 115.

Figure 2C:
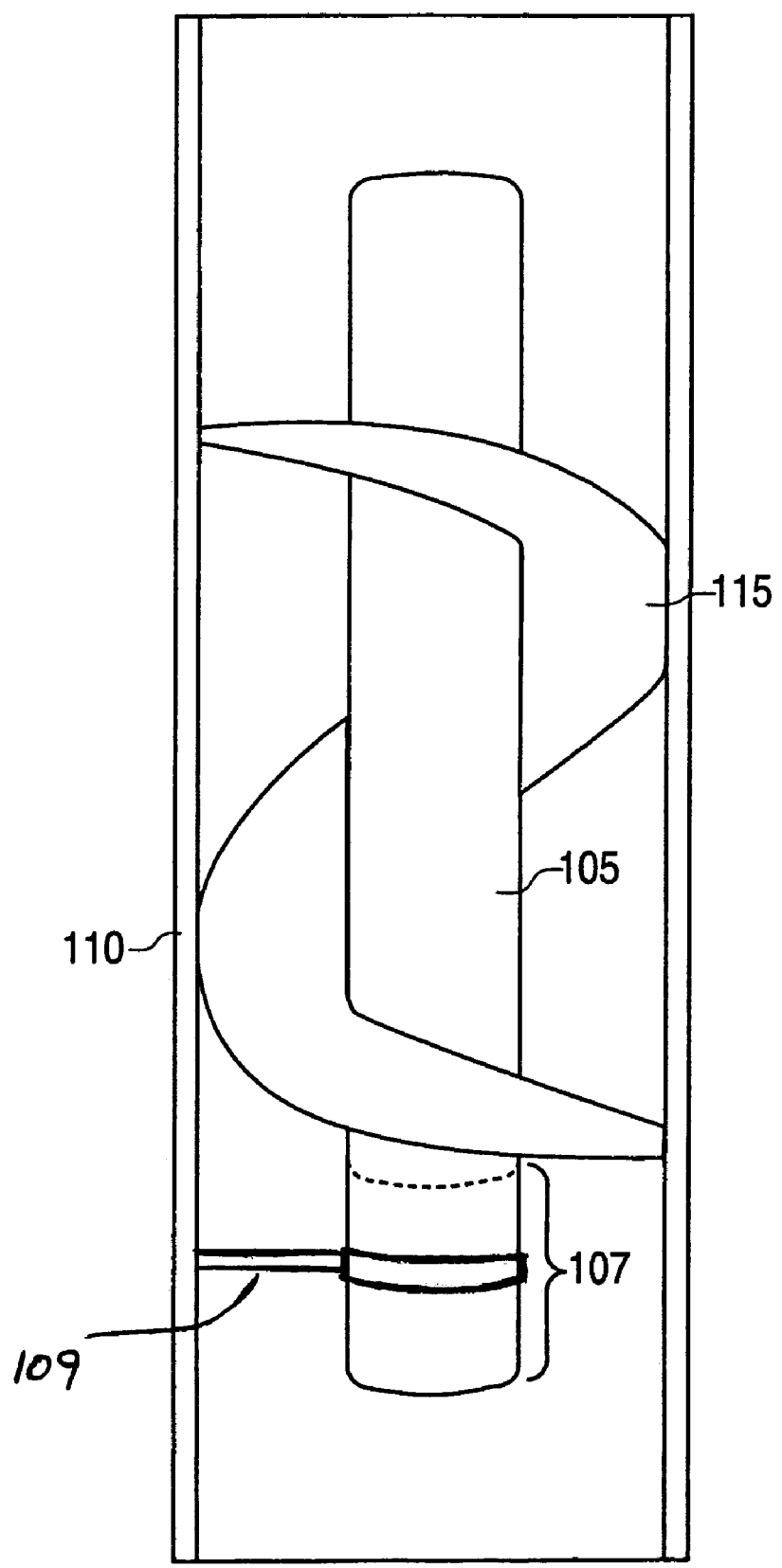
FIG. 2C is a schematic view of a vortex chamber tool, according to an embodiment of the invention.

FIG. 2C is a schematic view of a vortex chamber tool, according to an embodiment of the invention. As shown therein, the inlet plate 125 is omitted, allowing the flow to contact the corkscrew deflector 115 directly. The omission of the inlet plate 125 may also reduce additional back pressure created by the inlet plate 125. The portion 107 of the inner barrel 105 extending below the corkscrew deflector 115 may be used in securing the vortex chamber tool to the outer barrel 110. For example, a collar stop 109 may be coupled to both the portion 107 and the outer barrel 110.

Figure 3A:
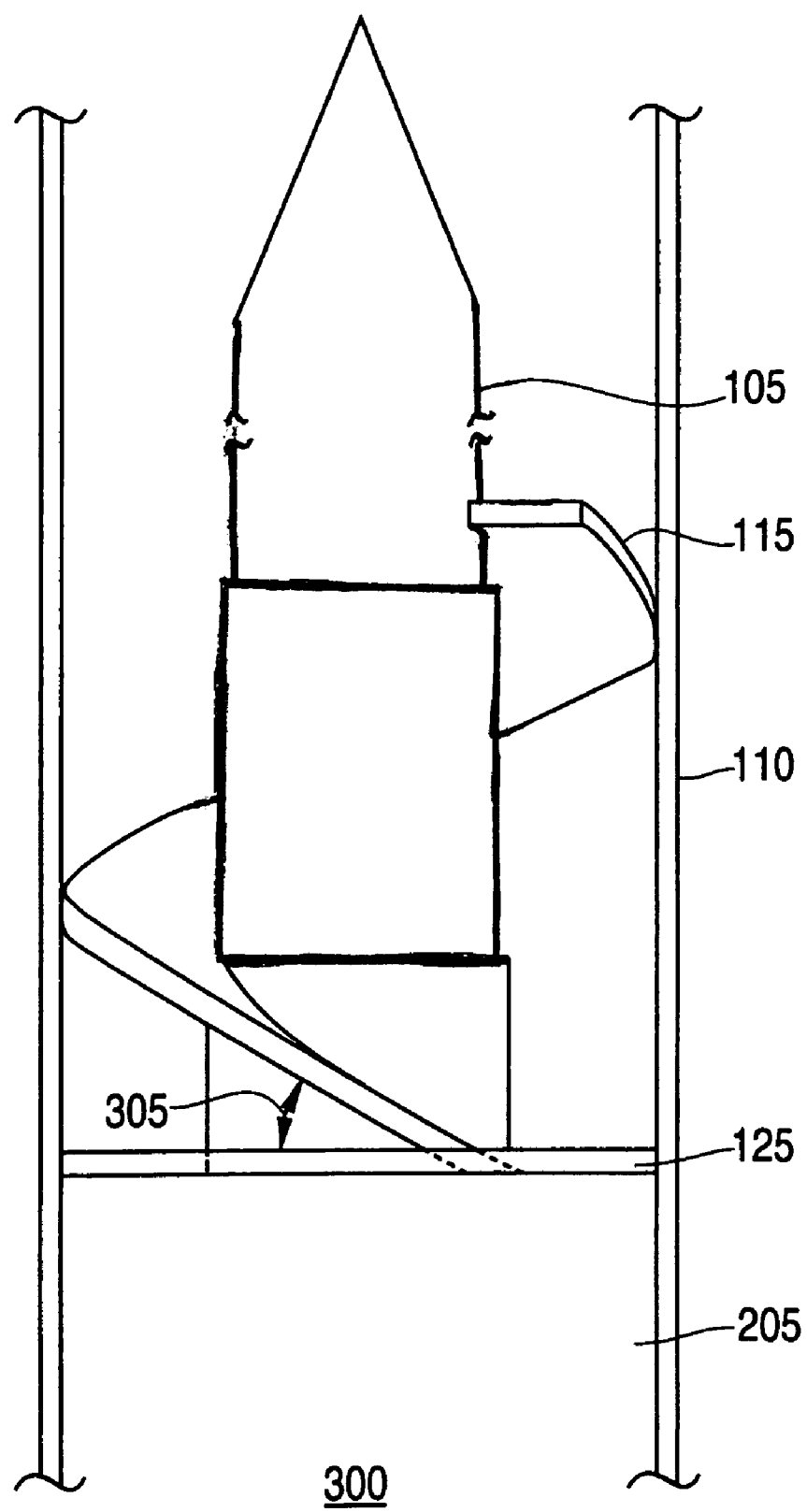
FIG. 3A is a schematic view of a vortex chamber tool, according to an embodiment of the invention.

FIG. 3A is a schematic view of a vortex chamber tool 300, according to an embodiment of the invention. As shown therein, the vortex chamber tool includes an inner barrel 105, an outer barrel 110, a corkscrew deflector 115, an inlet plate 125, and an input sleeve 205. The inner barrel 105 is approximately concentric with the outer barrel 110. Further, the corkscrew deflector 115 is affixed between the inner diameter of the outer barrel 110 and the outer diameter of the inner barrel 105. As illustrated, the corkscrew deflector 115 extends at an upward angle 305 with respect to the inlet plate 125. In a constructed prototype, the angle 305 is 70°.

Figure 3B:
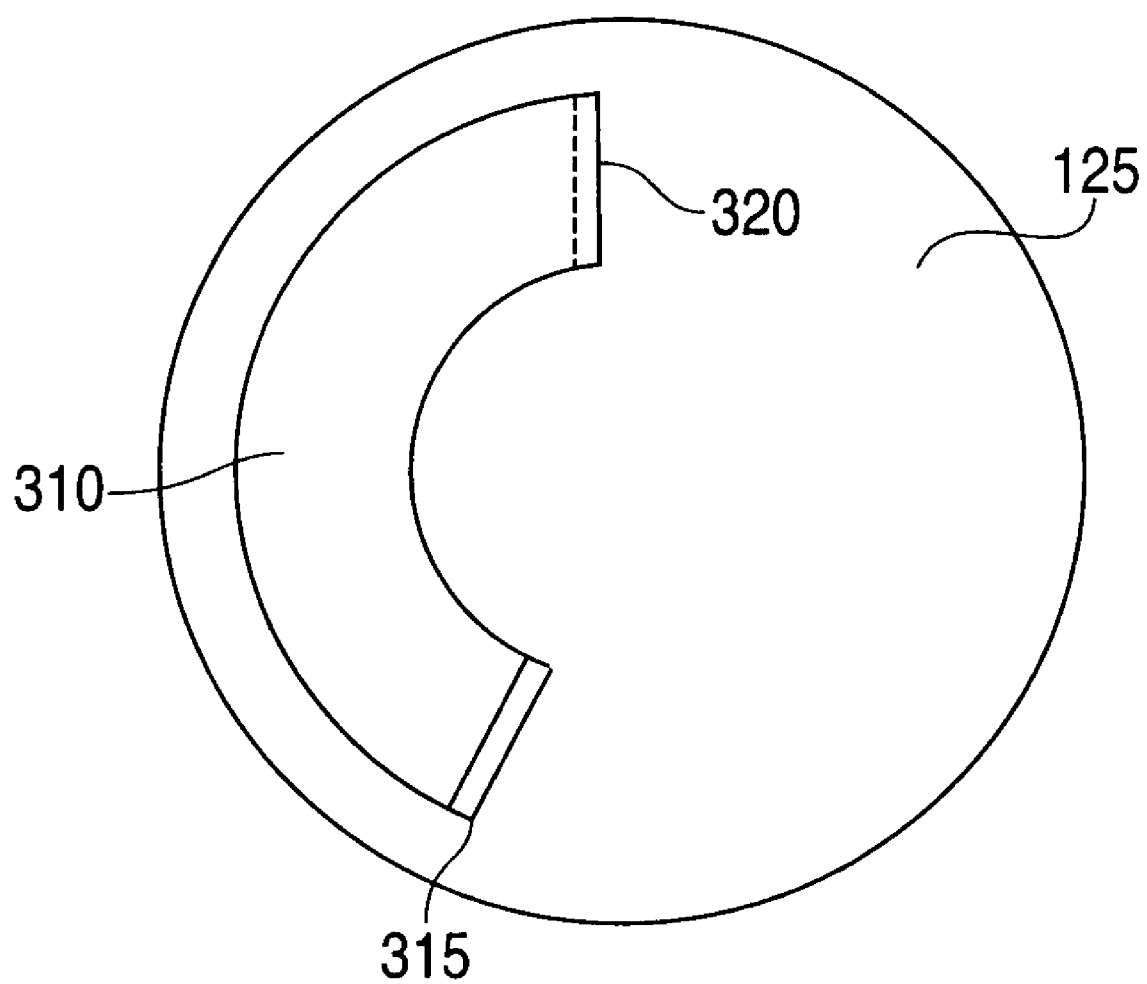
FIG. 3B is a top plan view of an inlet plate of a vortex chamber tool, according to an embodiment of the invention.

FIG. 3B is a top plan view of an inlet plate of a vortex chamber tool 300, according to an embodiment of the invention. As shown therein, the inlet plate 125 has an opening 310. The opening 310 is defined in a space between two concentric arcs with different radii, following the contour of an outer edge of inlet plate 125. The opening 310 has tapered edges 315 and 320 to further limit the head loss and affect the direction of fluid flow as the inlet plate 125 screens incoming fluid.

The embodiments described with reference to FIGS. 1–3B illustrate that many variations to the vortex chamber tool are possible. For example, the inner barrel 105 may be tapered or non-tapered, the inner barrel may be hollow or solid, the outer barrel 110 may be a component of the vortex chamber tool or a conduit that the vortex chamber tool is inserted into, inlet plate 125 is optional, and the input sleeve 205 is optional.

Many other variations are possible with respect to the embodiments of the invention illustrated in FIGS. 1–3B. For example, the size of the opening 310 in the inlet plate 125 may also be varied according to design choice. In relatively higher flow rate applications for instance, a smaller turn in the corkscrew deflector 115, a larger angle between the corkscrew deflector 115 and the inlet plate 125, and a larger inlet plate opening 310 may be appropriate. Conversely, in relatively lower flow rate conditions, a larger turn in the corkscrew deflector 115, a smaller angle between the corkscrew deflector 115 and the inlet plate 125, and a smaller opening 310 in the inlet plate 125 may be produce improved flow results. Thus, although the corkscrew deflector 115 is shown in FIGS. 1–3A with a 360° turn, empirical analysis has determined that corkscrew deflectors having as small as a 90° turn are suitable for some applications. Moreover, although the illustrated embodiment is described as having an angle 305 between the corkscrew deflector 115 and the inlet plate 125 of approximately 70°, empirical analysis has determined that the angle 305 may range from 15° to 75°, depending on the application.

For the reason that different flow conditions, fluid compositions, or other factors may require different tool geometries for optimum performance of the vortex chamber tool, the tool may also be adjustable. The angle 305, or the amount of turn in the corkscrew deflector 115, or the length of the corkscrew deflector 115 and/or the inner barrel 105, or any combination, may be adjusted in a single tool to optimize the performance of the tool. The adjustment may be static, performed prior to insertion of the tool. In the alternative, the tool may self-adjust in situ within a given range by reacting to actual or perceived pressure, flow rate, or other factors. The adjustment mechanism can be operated with mechanical, hydraulic, or electronic adjustment mechanisms. For example, as shown in FIG. 3A, the inner barrel 105 may be telescoping, with the corkscrew deflector 115 attached at different sections of the inner barrel 105 and sufficiently pliable to adjust with the change in inner barrel length. Alternatively, movement of the attachments of the corkscrew deflector to the inner barrel or outer barrel may adjust the corkscrew deflector.

The vortex chamber tool can be inserted into the conduit in a variety of ways. The outer barrel 110 may be existing conduit in a production line, allowing the vortex chamber tool to be inserted at any point in the line. The vortex chamber tool may be coupled to a traditional coupling nipple or other coupler and inserted into the conduit. The tool may also be a separate section of conduit to be placed between sections of the production line.

The inlet plate 125, or the corkscrew deflector 115, or both may be directly coupled to the outer barrel. The vortex chamber tool 300 may be coupled to the conduit by a variety of coupling methods, i.e., welding, fasteners, adhesives, etc. A ridge may also be formed on the inside surface of the outer barrel to hold the vortex chamber tool 300 in a position. The ridge may compliment the corkscrew deflector, allowing the tool to screw into the outer barrel, or the ridge may be created by inserting a fastener or other device into an opening in the outer barrel.

Although the inner barrel is shown with a substantial cross-section, the diameter of the inner barrel may be a variety of sizes, from substantially zero to approaching the inner diameter of the outer barrel. The inner barrel may also be solid or hollow.

Although the deflector as shown is a corkscrew deflector, other configurations of the deflector contemplated, such as fins, blades, and other devices to create a vortex flow in a conduit.

Figure 4:
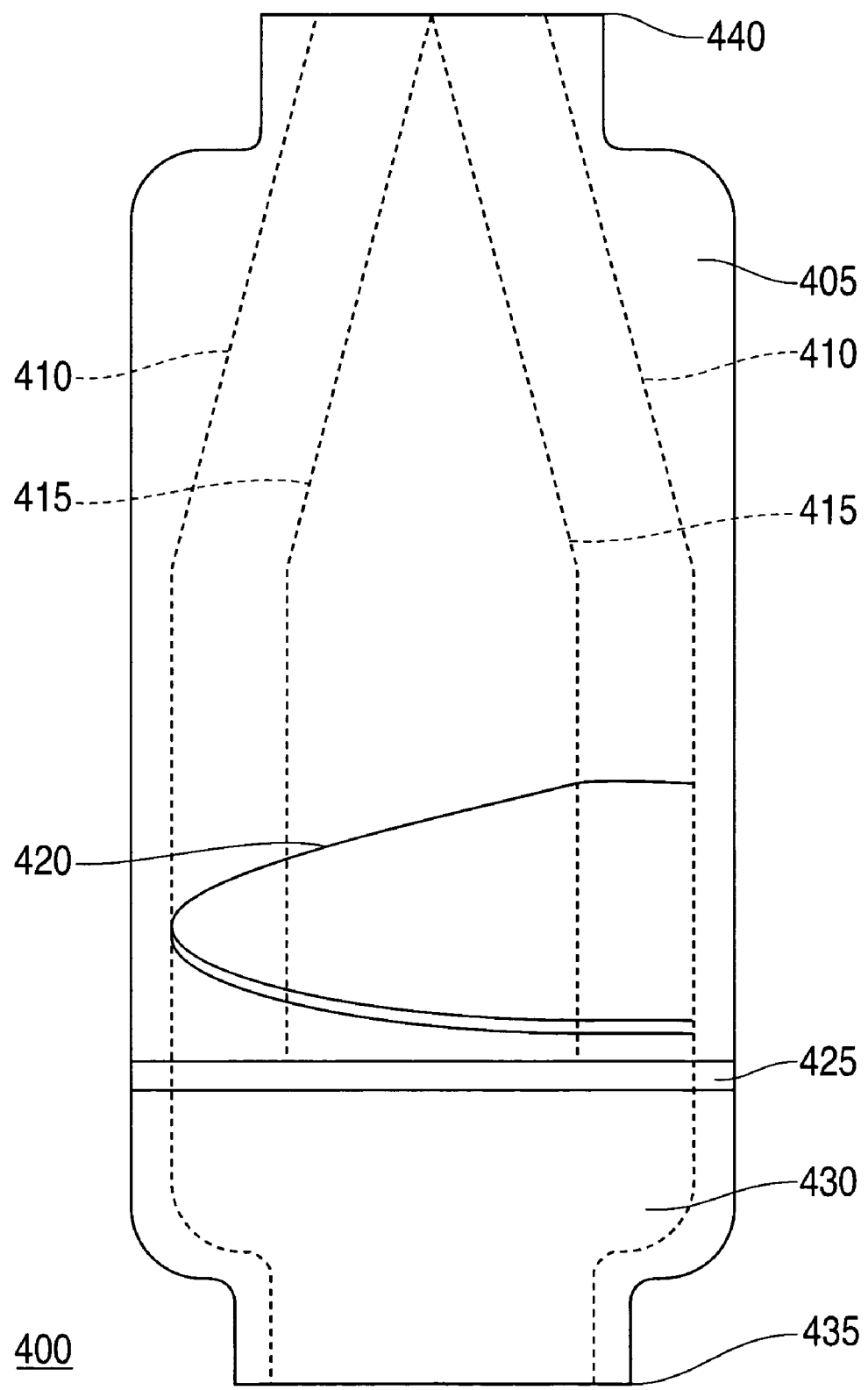
FIG. 4 is a sectional view of a vortex chamber tool, according to an embodiment of the invention.

FIG. 4 is a sectional view of a vortex chamber tool 400, according to an embodiment of the invention. As shown therein, the vortex chamber tool includes an outer casing 405, an inner barrel 415, a corkscrew deflector 420, an inlet plate 425 and an input sleeve 430. The outer casing 405 has an inner dimension 410. The corkscrew deflector 420 is affixed between the inner dimension 410 of the outer casing 405 and an outer dimension of the inner barrel 415. The input sleeve 430 has a narrow diameter at an input side 435 and a wider diameter at the inlet plate side. The outer casing 405 also has a wider diameter at the inlet plate 425 and a narrow diameter at the opposing end 440.

In operation, the fluid enters in the input sleeve 430 and passes through an opening in the inlet plate 425. The fluid is then deflected by the corkscrew deflector 420 in a direction tangential to the longitudinal axis of the inner barrel 415, causing a vortex in the flow of incoming fluid.

An advantage of the configuration illustrated in FIG. 4 is that the diameter of the inlet plate 425, and the widest diameter of housing 405, exceed the diameter of the input conduit at interface 435 and the diameter of the output conduit at interface 440. Thus, a designer may optionally increase the diameter of the inner barrel 415 and/or the fluid chamber between the inner diameter 410 of the outer casing 405 and the inner barrel 415 according to design choice. The result may be less resistance in the vortex chamber 400 than if the outer dimension at interfaces 435 and 440 were not exceeded by the largest outer dimension of the outer casing 405.

Many variations are possible with respect to the embodiment of the invention illustrated in FIG. 4. For example, the outer dimension at interfaces 435 and 440 need not be the same. In addition, in other embodiments, the outer dimension at either interface 435 or 440 may be the same as the outer dimension of the outer casing 405.

Other variations, such as those discussed with reference to FIGS. 1–3B above can also be employed with the embodiment of FIG. 4.

Figure 5:
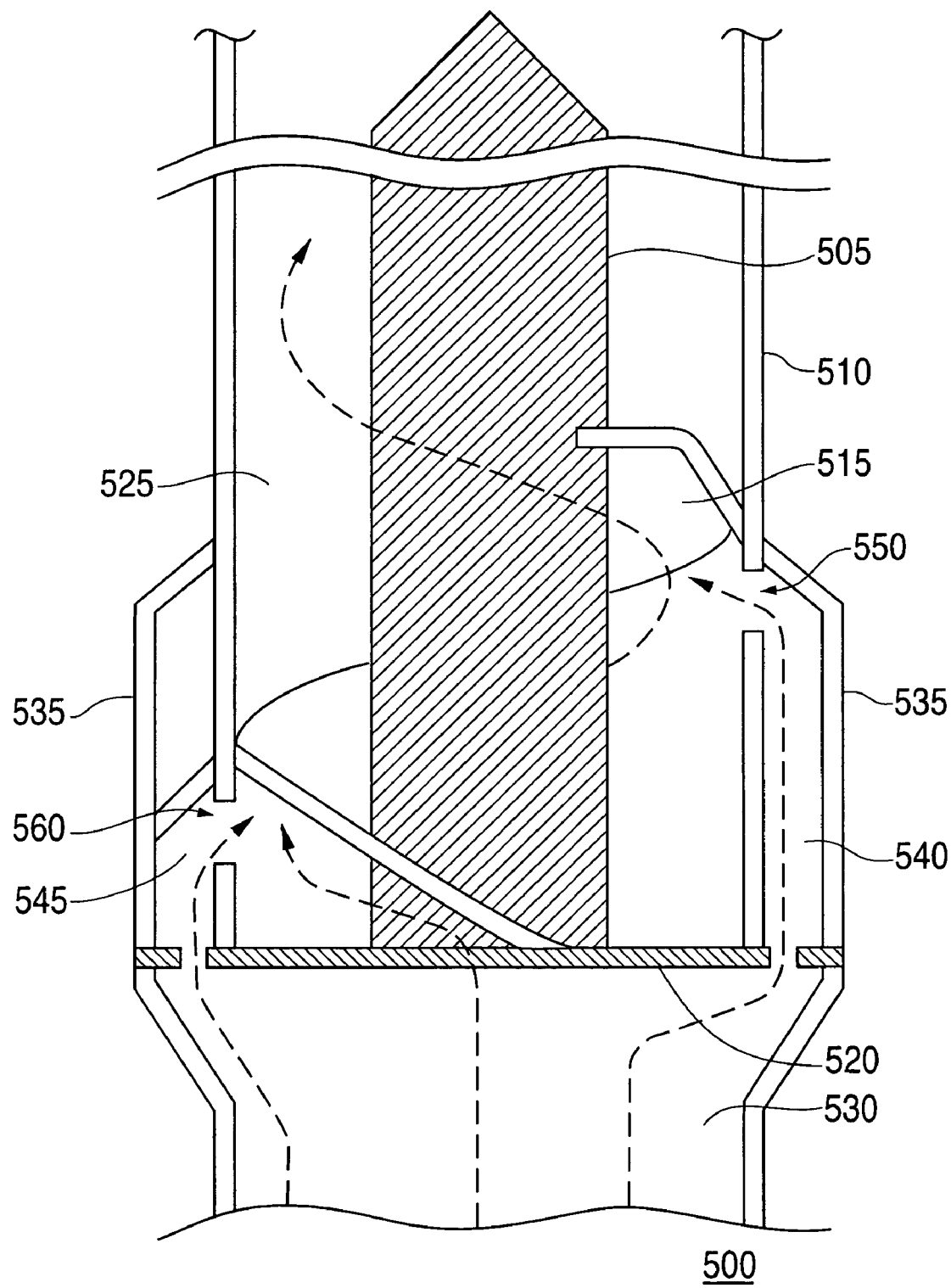
FIG. 5 is a sectional view of a portion of a vortex chamber tool, according to an embodiment of the invention.

FIG. 5 is a sectional view of a portion of a vortex chamber tool 500, according to an embodiment of the invention. As shown therein, the vortex chamber tool 500 includes an inner barrel 505, an outer barrel 510, a corkscrew deflector 515, an inlet plate 520, an input sleeve 530 and an outer casing 535. The inner barrel 505 is situated approximately concentric with the outer barrel 510 and the outer casing 535. The corkscrew deflector 515 is affixed in a chamber 525 between the inner diameter of the outer barrel 510 and the outer diameter of the inner barrel 505. Chambers 540 and 545 are created between an inner dimension of the outer casing 535 and outer dimension of the outer barrel 510. Openings in the inlet plate 520 allow fluid into the chambers 525, 540 and 545. Further, side inlets 550 and 560 in the outer barrel 510 allow for fluid flow from chamber 540 to chamber 525, and from chamber 545 to chamber 525.

In operation, fluid enters the input sleeve 530 and flows through the inlet plate 520. Openings in the inlet plate 520 direct the fluid to the chambers 525, 540, and 545. The corkscrew deflector 515 deflects fluid entering chamber 525. The outer casing 535 deflects fluid entering chambers 540 and 545 such that fluid enters the chamber 525 from chambers 540 and 545, via side inlets 550 and 560, respectively, at an angle tangential to the longitudinal axis of the inner barrel 505. The effect of fluid entering side inlets 550 and 560 is to further accelerate the vortex flow of fluid within chamber 525.

Many variations are possible with respect to the embodiment of the invention illustrated in FIG. 5. For example, although two side inlets 550 and 560 are shown, in other embodiments, there may be a single side inlet or more than two side inlets. In addition, the inner barrel 505 may be hollow or solid, and the inner barrel 505 may be tapered or non-tapered.

Figure 6A:
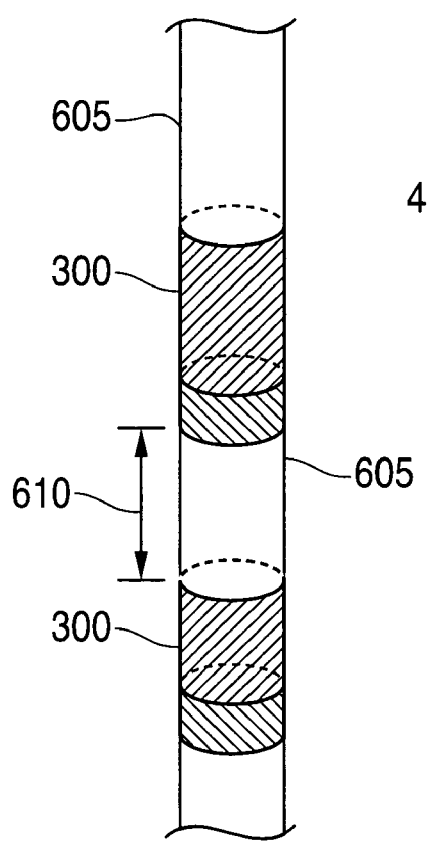
FIG. 6A is a schematic view of a fluid transport system, according to an embodiment of the invention.

FIG. 6A is a schematic view of a fluid transport system, according to an embodiment of the invention. As shown therein, a first vortex chamber tool 300 is separated from a second vortex chamber tool 300 by a distance 610. Preferably, the distance 610 is the length of conduit where the benefits of a first vortex chamber tool 300 can be realized.

The distance 610 can be optimized to organize the flow up to the point where the flow is no longer benefiting from the vortex, e.g., after the vortex has degraded, or the flow returns turbulent. The optimal distance 610 will vary depending on the fluid properties, the properties of the conduit, and the flow rates in the conduit along distance 610.

In one embodiment, vortex chamber tools 300 may be installed within conduit 605. In another embodiment, vortex chamber tools 300 are installed between portions of the conduit 605, for example, by threading, welding, or otherwise attaching a self-contained vortex chamber tools 300 between portions of a conduit 605.

Figure 6B:
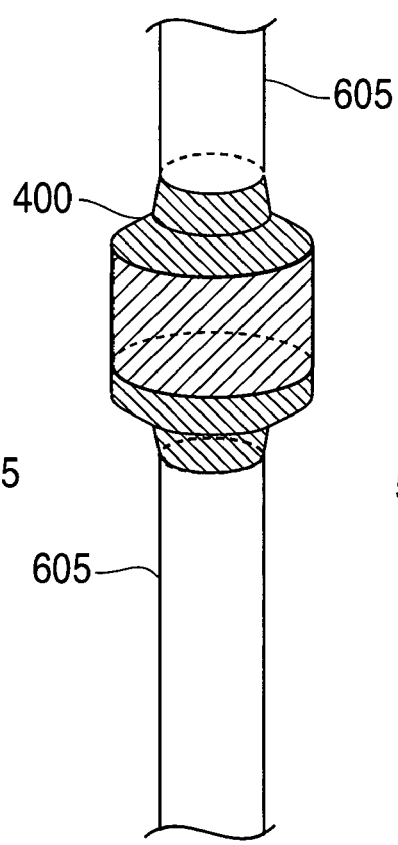
FIG. 6B is a schematic view of a fluid transport system, according to an embodiment of the invention.

FIG. 6B is a schematic view of a fluid transport system, according to an embodiment of the invention. As shown therein, a vortex chamber tool 400 is coupled to a conduit 605. In the illustrated embodiment, the widest diameter of the vortex chamber tool 400 is greater than the diameter of the conduit 605. In other embodiments two or more vortex chamber tools could be coupled to conduit 605 as described above with reference to vortex chamber tools 300 in FIG. 6A.

Figure 6C:
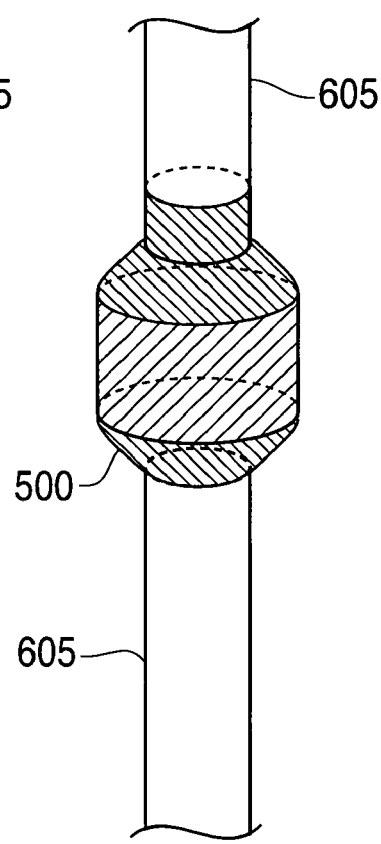
FIG. 6C is a schematic view of a fluid transport system, according to an embodiment of the invention.

FIG. 6C is a schematic view of a fluid transport system, according to an embodiment of the invention. As shown therein, a vortex chamber tool 500 is coupled to a conduit 605. In the illustrated embodiment, a widest diameter of vortex chamber tool 500 is greater than the diameter of the conduit 605. In other embodiments two or more vortex chamber tools could be coupled to conduit 605 as described above with reference to vortex chamber tool 300 in FIG. 6A.

Where space is constrained external to a conduit 605, the implementation illustrated in FIG. 6A, where vortex chamber tools 300 are substantially as disclosed above with reference to FIGS. 1–3B, may be advantageous. On the other hand, the vortex chamber tools 400 and 500, having the features substantially described above with reference to FIGS. 4 and 5 above, respectively, may be advantageous to provide less restrictive flow where clearance is available beyond the outside dimension of the conduit 605.

An Exemplary Method

FIG. 7 is a process flow diagram of a method for transporting fluid, according to an embodiment of the invention. As shown therein, the process begins by receiving a fluid at an input portion of a conduit in step 705. The process then advances by screening the fluid with an inlet plate in step 710. Next, the process deflects the fluid around an inner barrel with a corkscrew deflector to create a vortex. Finally, the fluid is output at a downstream portion of the conduit in step 720.

The method illustrated in FIG. 7 may be performed using any of the foregoing apparatuses. Using the vortex chamber tool depicted in FIG. 5, the method would additionally include directing a portion of the incoming fluid through at least one side inlet. The screening step 710 may be accomplished without an inlet plate by the corkscrew deflector.

CONCLUSION

In conclusion, embodiments of the invention provide, among other things, a vortex chamber tool, an improved fluid transport system, and a method that can be used to increase the production of fluid with a marginal increase in the expenditure of resources. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims. For example, features of the vortex chamber tools and conduits described herein can be fabricated of metal, plastic, or other suitable materials, according to design choice. In addition, vortex chamber tools may be used in combination with processes conventionally used, (i.e., gas lift, plunger lift, etc.), to remove liquids from conduits that are horizontal, inclined, or vertical in orientation.

What is claimed is:

1. A tool, comprising:
an inner barrel having a first end and a second end;
a corkscrew deflector coupled to the inner barrel originating at the first end and extending towards the second end; and
an inlet plate coupled to the first end of the inner barrel, the inlet plate having an aperture defined by a space between two concentric arcs, the aperture substantially following the contour of an edge of the inlet plate;
wherein the edges of the aperture in the inlet plate are substantially tapered.

2. The tool of claim 1, further comprising an outer barrel coupled to the corkscrew deflector; and
an input sleeve, the input sleeve coupled to the inlet plate, the input sleeve having an outer diameter substantially equal to the outer diameter of the outer barrel.

3. The tool of claim 2, wherein the input sleeve has an unobstructed bore.

4. The tool of claim 1, wherein the corkscrew deflector extends at least 90 degrees around the inner barrel.

5. The tool of claim 1, wherein the corkscrew deflector forms an angle with respect to the inlet plate of between 15 and 75 degrees.

6. The tool of claim 5, wherein the angle is 70 degrees.

7. The tool of claim 1, further comprising an outer barrel coupled to the corkscrew deflector, a fluid chamber being formed between the inner barrel and the outer barrel.

8. The tool of claim 7, wherein the outer barrel has an output neck on a distal end of the outer barrel extending away from the inlet plate, the output neck having a diameter less than a diameter of the inlet plate.

9. The tool of claim 7, further comprising at least one side inlet in the outer barrel.

10. The tool of claim 1, wherein at least one end of the inner barrel is substantially pointed.

11. A tool comprising:
an inner barrel having at least one side aperture;
an outer barrel being concentric with the inner barrel to define a first fluid chamber between the inner barrel and the outer barrel, the outer barrel having at least one side aperture;
a corkscrew deflector disposed in the first fluid chamber;
an outer casing concentric with the outer barrel to define a second fluid chamber between the outer barrel and the outer casing, the second fluid chamber being in fluid communication with the first fluid chamber through the at least one side aperture; and
an inlet plate having a first aperture and a second aperture, the first aperture adapted to provide fluid communication between an inlet and the first fluid chamber, and the second aperture adapted to provide fluid communication between the inlet and the second fluid chamber.

12. The tool of claim 11, wherein an end of the inner barrel proximate to an output of the fluid chamber is substantially tapered.

13. The tool of claim 11, wherein an end of the outer barrel proximate to an output of the fluid chamber is tapered.

14. A tool comprising:
an outer barrel having an inlet and an outlet;
an inner barrel substantially concentric with the outer barrel and disposed between the inlet and the outlet; and
a corkscrew deflector disposed between the inner barrel and the outer barrel, the corkscrew deflector coupled to an outer surface of the inner barrel and an inner surface of the outer barrel;
wherein the corkscrew deflector is adjustable between a first position having a first corkscrew angle and a second position having a second corkscrew angle different from the first corkscrew angle;
wherein a length of the inner barrel is adjustable between a first length corresponding to the first corkscrew angle and a second length corresponding to the second corkscrew angle.

15. the tool of claim 14, wherein the inner barrel is telescopic.

16. The tool of claim 14, further comprising a stop coupled to a portion of the inner barrel, the stop configured to couple the inner barrel to the inner surface of the outer barrel.

* * * * *

UNITED STATES PATENT AND TRADEMARK OFFICE
CERTIFICATE OF CORRECTION

PATENT NO. : 7,160,024 B2 Page 1 of 1
APPLICATION NO. : 10/727490
DATED : January 9, 2007
INVENTOR(S) : Dougherty, Sr. et al.

It is certified that error appears in the above-identified patent and that said Letters Patent is hereby corrected as shown below:

Column 9, line 38, Claim 11    Delete "having at least one side aperture"

Column 10, line 34, Claim 15   Delete "the tool",
                               Insert --The tool--

Signed and Sealed this

Sixteenth Day of October, 2007

JON W. DUDAS
*Director of the United States Patent and Trademark Office*